US006983346B2

(12) United States Patent
Zhang

(10) Patent No.: US 6,983,346 B2
(45) Date of Patent: Jan. 3, 2006

(54) REDUCING TAG-RAM ACCESSES AND ACCELERATING CACHE OPERATION DURING CACHE MISS

(75) Inventor: Jonathan Y. Zhang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 19 days.

(21) Appl. No.: 10/435,357

(22) Filed: May 9, 2003

(65) Prior Publication Data
US 2004/0024967 A1    Feb. 5, 2004

Related U.S. Application Data

(60) Provisional application No. 60/379,503, filed on May 10, 2002.

(51) Int. Cl.
G06F 12/00 (2006.01)
(52) U.S. Cl. .................................... 711/138; 711/144
(58) Field of Classification Search ............... 711/137, 711/138, 144
See application file for complete search history.

(56) References Cited

U.S. PATENT DOCUMENTS

| 4,370,710 | A  |   | 1/1983  | Kroft |
| 4,905,141 | A  | * | 2/1990  | Brenza ........................ 711/129 |
| 5,860,104 | A  | * | 1/1999  | Witt et al. .................. 711/137 |
| 5,987,561 | A  | * | 11/1999 | Witt et al. ...................... 711/3 |
| 6,560,679 | B2 | * | 5/2003  | Choi et al. .................. 711/138 |
| 6,584,549 | B2 | * | 6/2003  | Abdallah et al. ........... 711/137 |
| 6,775,741 | B2 | * | 8/2004  | Ebeshu et al. .............. 711/118 |
| 2001/0049772 | A1 |  | 12/2001 | Choi et al. |
| 2004/0123034 | A1 | * | 6/2004  | Rogers et al. .............. 711/118 |
| 2004/0153607 | A1 | * | 8/2004  | Rowlands et al. .......... 711/118 |

OTHER PUBLICATIONS

Wilson, K.,M., et al.; *Increasing Cache Port Efficiency for Dynamic Superscalar Microprocessors*, Proc. of the 23$^{rd}$ Annual Symp. On Computer Architecture. Philadelphis, PA, May 22-24, 1996, Proc. of the Annual Symp. On Computer Architecture, NY, ACM/IEEE, US, vol. SYMP. 23, May 22, 1996, pp. 147-157.

\* cited by examiner

Primary Examiner—Matthew D. Anderson
Assistant Examiner—Hetul Patel
(74) Attorney, Agent, or Firm—Robert D. Marshall, Jr.; W. James Brady, III; Frederick J. Telecky, Jr.

(57) ABSTRACT

This invention is a cache memory employing a tag bypass controller to detect a memory access to the same cache line as a last cache miss address and a last cache hit address. This information is uses for efficient data accesses and forwarding. Registers store the last miss-address and the last hit-address and corresponding valid flags. These hardware features allow reduced tag-RAM accesses and greatly reduce the latency required to fully re-stock a missed cache line.

2 Claims, 4 Drawing Sheets

REDUCING TAG-RAM ACCESSES AND ACCELERATING CACHE OPERATION DURING CACHE MISS

This application claims priority under 35 USC §119(e)(1) of Provisional Application No. 60/379,503, filed May 10, 2002.

TECHNICAL FIELD OF THE INVENTION

The technical field of this invention is data processor cache.

BACKGROUND OF THE INVENTION

Cache memory is the fundamental block in a hierarchical memory system. Because the entire hierarchy is designated as cache or cache memory, the following terms are adopted here In the text of this application, the lowest level cache designed to handle the most critical data storage is designated as the main cache. Lower levels of cache hierarchy are designated as Level-1 cache and Level-2 cache, higher numbers indicating decreasing order of performance and criticality. Thus, when a processor function requests data, that data is sought from the main cache first. Conventional protocols dictate that the fetch address must be compared to tag addresses stored in a main cache tag-RAM bearing the stored address tags from recent fetch requests. If the fetch address does not match the addresses stored in the tag-RAM then a lower level of cache RAM hierarchy must be queried to obtain the data. These lower level cache RAMs have a similar protocol. No hit for the fetch address results in a corresponding search at yet a lower level of cache memory.

If an initial search at the main cache level results in a miss, then the data is typically retrieved from a lower level external memory source and is written into the main cache data-RAM as a fill in anticipation of further need for the data. Future accesses for this same address result in a hit because that the data is available in main cache. If the fetch from cache results in a hit, such data is referred to as resident data already available in the cache.

A main cache usually has at least one tag-RAM at least one data-RAM. Stored tag information includes tag valid register bits. The tag-RAM is used to store address tags for the cache lines stored in data-RAM. A cache memory line usually contains more than one entry of data. An entry is a unit of data returned from cache memory to central processing unit (CPU). The tag valid bits indicate whether the tags are valid. If a main cache is an instruction cache, then the CPU can on fetch data from it. If a main cache is a data cache, then the CPU can not only fetch data from it, but also store data to it. This invention can apply equally to instruction cache or data cache, or even lower level caches. An example of main instruction cache is described. Therefore the CPU accesses to the cache consist of only fetches in this example.

First, a fetch to a cache normally requires a tag-RAM. access and a data-RAM access to retrieve the correct data. While a data-RAM access is absolutely necessary to retrieve data from a cache, the tag-RAM access is not entirely unavoidable. Power can be saved if it is possible to avoid access to tag-RAM. The task is to determine how superfluous tag-RAM accesses may be bypassed.

Second, the performance of a cache memory system is greatly affected by the so called miss penalty, which is defined as the performance impact resulting from a cache miss. In handling a cache miss, the crucial data has to be retrieved from one level lower in the hierarchical memory system. The latency required to fully stock up a missed cache line ranges from tens to thousands of clock cycles depending on the speed of the lower level of the memory hierarchy and the cache line size. A number of design options have been explored to reduce the waiting period.

FIG. 1 illustrates the logical organization of an example prior art two-way cache memory. FIG. 1 illustrates this example the cache having 512 sets identified by reference numbers 100 to 105. Each set has twoways of data 110 and 111, tag bits 106 and 107 and valid bits 108 and 109. Cache line replacement depends upon the least-recently-used (LRU) word 112, but is not a crucial concern here. What is important in this example is that each cache line has four entries of data in each way. These are entries 120 to 123 in way 110 and entries 130 to 133 in way 111. The CPU can fetch only one entry each system clock cycle. The cache example of FIG. 1 illustrates the possible advantages that improvements could provide.

Conventional Cache Operation

FIG. 2 illustrates the conventional operation of the example main cache memory of FIG. 1. In a first example, data FD1 corresponding to fetch address FA1 is initially not resident in the main cache data-RAM 215. Data FD2, FD3, FD4 are also not resident. On the other hand data FD5 and FD6 are resident and available in the main cache data-RAM 215. A stream of four fetch request addresses 201, including addresses FA1, FA2, FA3, and FA4 belonging to one cache line, arrive at the input to the main cache memory. Another stream of two fetch request addresses 202, including addresses FA5 and FA6 belonging to another cache line, follows. In this example, the input fetches will be processed in order of their appearance in the input stream: FA1, FA2, FA3, FA4, FA5, and FA6. When more than one fetch belongs to the same cache line, brackets [ ] around the addresses are used in FIG. 2 to emphasize the concept. Thus fetch addresses [FA1, FA2, FA3, FA4] of stream 201 belong to one cache line and fetch addresses [FA5, FA6] of stream 202 belong to another cache line. For each of the six fetch requests, a lookup 203 in tag-RAM 210 is conducted. These yield two corresponding tags 204, 206 and two corresponding valid bits (LV) 205, 207 for each lookup. Tag compare and validate processing block 208 and cache hit or cache miss query block 213 are performed after each lookup 203 to determine if the wanted data is in the main cache resulting in a cache-hit 216, or not resulting in a cache-miss 217.

Fetch address FA1 generates a cache-miss 217, therefore the CPU fetch operation comes to a halt. Before the CPU fetch operation can resume for the following fetch addresses FA2, FA3, etc., the data from the entire cache line including FD1, FD2, FD3 and FD4 has to be transferred from external memory via paths 218 and 226 to cache data-RAM 215. One of the cache lines in the two-way associative set pointed to by fetch address FA1 is allocated to host the new cache line and the external memory data is transferred this cache line. The time required to carry out the least-recently-used algorithm is not the main concern of this invention. The tag corresponding to fetch address FA1 is written to the tag space of the allocated line, and the corresponding line-valid-bit is set, before fetches from the CPU can resume. The fetch data FD1 can be forwarded directly to the CPU via path 227. Then fetches will resume for fetch addresses FA2, FA3, FA4, FA5 and FA6. These five additional fetches are subjected to lookup 203 from the tag-RAM 210 and sequentially generate cache hits 216. The requested data FD2, FD3, FD4, and FD5 and FD6 are read out via signal 216 from data-RAM 215 directly and sequentially via path 228 and supplied to the CPU via path 222.

Designers have long recognized that two clear improvements could be made to this implementation. The improvements, however, require complex control logic that is difficult to design and verify. Thus the possible improvements have been largely ignored. The two possible improvements are as follows:

1) In the example of FIG. 2, fetch addresses FA1, FA2, FA3 and FD4 share one tag, and fetch addresses FA5 and FA6 share another tag but the flow causes six tag lookups. Only two tag lookups not six are actually necessary. This difference allows for a first conceptual improvement.

2) While data FD1 is directly forwarded to the CPU, data FD2, FD3 and FD4 are not. The three latter fetches of FD2, FD3 and FD4 are delayed until the cache line fill is completed. This adds latency to the operation. Data FD2, FD3 and FD4 could also have been forwarded directly to the CPU, eliminating the unnecessary latency. Furthermore, the data-RAM access for retrieving data of FD2, FD3 and FD4 can be eliminated. Therefore reducing the power consumed by the data-RAM.

SUMMARY OF THE INVENTION

This invention is a cache memory employing a tag bypass controller to detect a memory access to the same cache line as a last cache miss address and a last cache hit address. This information is uses for efficient data accesses and forwarding. Registers store the last miss-address and the last hit-address and corresponding valid flags. These hardware features allow reduced tag-RAM accesses and greatly reduce the latency required to fully re-stock a missed cache line.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
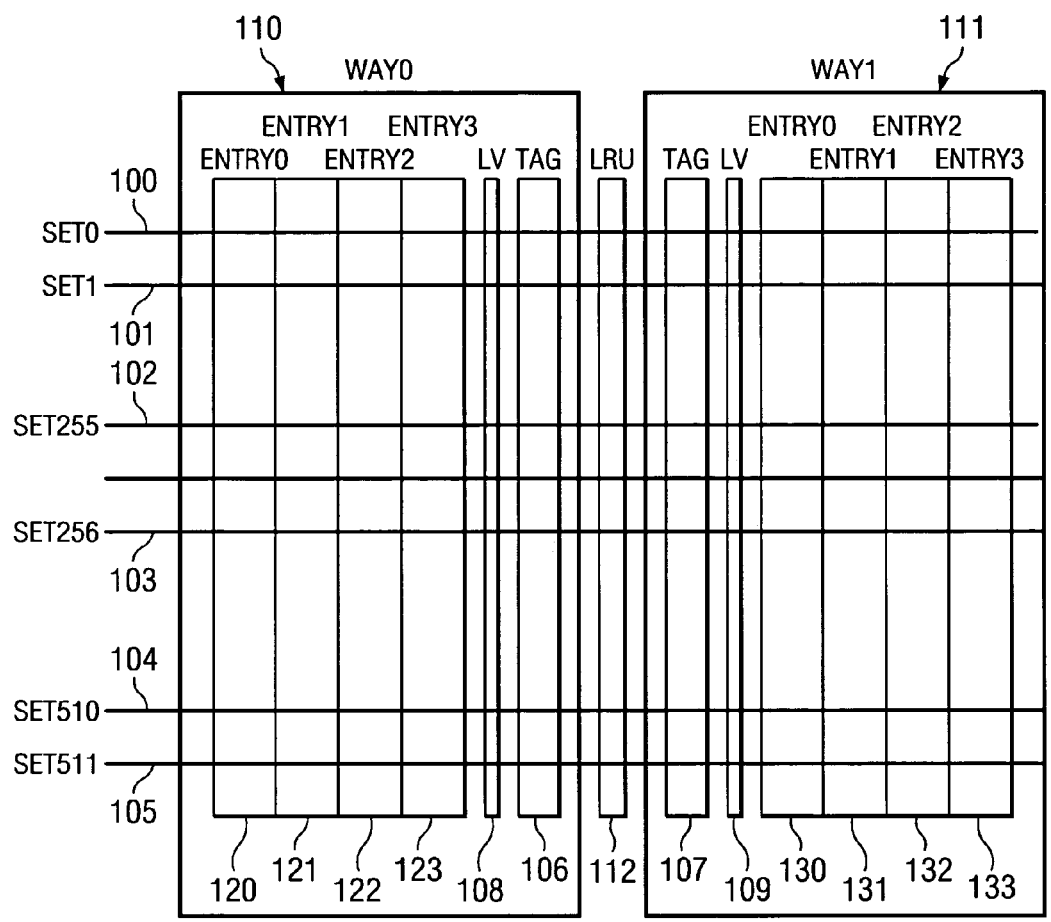
FIG. 1 illustrates the logical organization of an example two-way cache memory (Prior Art)

The first objective of the present invention is to eliminate unnecessary tag-RAM accesses in the main cache. This involves determining under what conditions and in what manner a tag-RAM access may be bypassed. The second objective is to reduce performance impact resulting in a so called miss penalty, which is defined as the performance impact resulted from a cache miss. In handling a cache miss, the crucial data has to be retrieved from one level lower in a hierarchical memory system. Any reduction of the latency resulting from returning data to the CPU due to the requirement of full restoration of a cache line in the cache (also known as stock-up or restock) provides significant Performance improvement.

As noted above in the background to the invention, even conventional main cache memory car benefit by two clear improvements that may be identified. First, a fetch to a main cache normally requires a tag-RAM access and a data-RAM access to retrieve the correct data. While a data-RAM access is absolutely necessary, the tag-RAM access is not entirely unavoidable. It is preferred from power saving point of view not to access tag-RAM if possible. This required determining under what conditions the tag-RAM access may be bypassed.

Second, the performance of a cache memory system is greatly affected by the so called miss penalty, which is defined as the performance impact resulting from a cache miss. In handling a cache miss, the crucial data has to be retrieved from one level lower in the hierarchical memory system. The latency required to fully stock up a missed cache line ranges from tens to thousands of clock cycles depending on the speed of the lower level of the memory hierarchy and the cache line size. In order to reduce the waiting period, new design options have been explored.

The manner in which these desirable concepts are included in the method of this invention is unique. Both the last cache-hit-address and the last cachemissaddress are stored in registers and compared with the current fetch address. If the fetch address belongs to the same cache line as either the cache-hit-address register content or the cache-miss-address register content and the corresponding register contents are valid, then the tag-RAM is bypassed. The cache-hit-address register holds fetch address of the most recent cache-hit. The cache-miss-address register holds the address of the cache-line that is being restocked. This invention does not require that consecutive fetches belong to the same cache line to allow tag-RAM bypass. In fact, if consecutive fetch addresses are in alternating fashion, belonging to either the miss-line or hit-line, tag-RAM bypass for this entire fetch stream is still possible. For example, when a main cache memory line is in the process of re-stocking, there could be fetches into the main cache that fall into the re-stocking line or a valid main cache line in alternating fashion. Unlike some proposed solutions, the present invention would still enable a tag-RAM bypass even in this case.

Protocol for the Cache with Tag-RAM Bypass Capability

Figure 3:
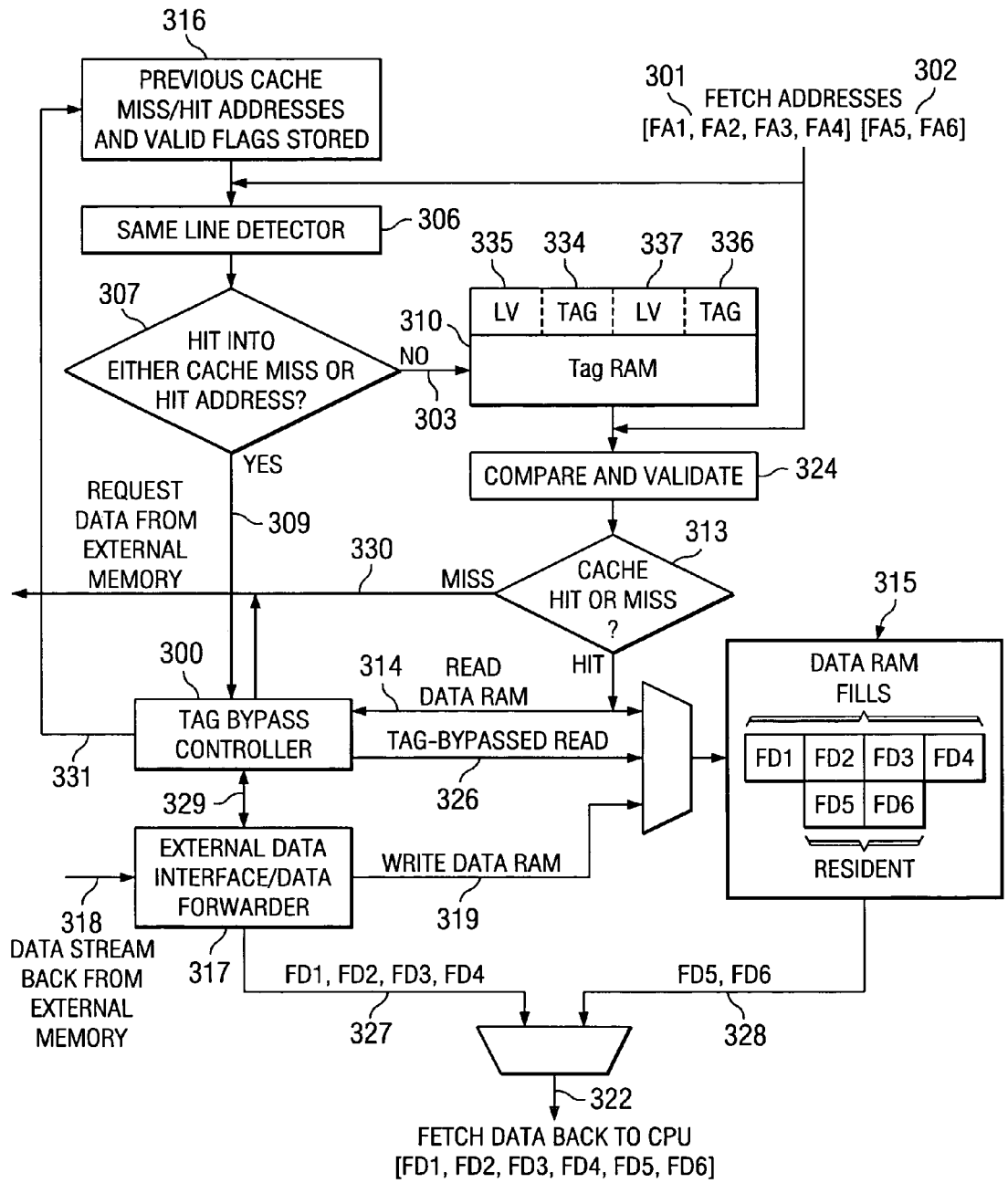
FIG. 3 illustrates a flow diagram of the improved operation of the two-way cache memory of this invention.

FIG. 3 illustrates a flow diagram describing the protocol of the improved main cache implementation of this invention. Fetch address inputs 301 or 302 are compared with currently stored cache-miss and cache-hit address registers 316 for match. The address compare is done after truncating a small number of least significant address bits from the cache-miss or cache-hit line addresses and the fetch address. The truncated least significant address bits have a specific value for each separate entry within a cache line. The result of the compare must be validated with the valid flag of a cache-miss address register or a cache-hit address register. A match is declared for miss or hit line address, only if the truncated addresses match with each other and the corresponding valid flag is set.

Decision block 307 makes decisions based on the result of comparison of block 306. The following are possible alternatives in decision block 307:

a) A read access 303 is issued to the tag-RAM 310 if a match is detected between the fetch address and either the cache-miss address or the cache-hit address; and b) No read access issued to the tag-RAM 310 if no match is detected between the fetch address and either the cache-miss address or the cache-hit address.

Tag bypass controller 300 is notified of the result of comparison of block 306 and the decision of decision block 307. Tag bypass controller 300 monitors the progress of the miss line refill. It is informed which the miss-line entry is received from external memory and which miss-line entry has not been received. Tag bypass controller 300 also remembers the manner in which data may be retrieved from data-RAM for the current cache-hit line and the current cache-miss line. Tag bypass controller 300 takes the following action according to the result of the comparison:

i) If a match is found with the cache-miss address (but not with the cache-hit address), tag bypass controller 300 will check whether the fetch data entry has been received.

If Yes, then tag bypass controller 300 issues a read to data-RAM 315 to retrieve data.

If No, then Tag bypass controller 300 will wait for the data entry to be received and then bypasses the data entry directly to CPU via path 327.

ii) If a match is found with the cache-hit address (but not with the cache-miss address), then tag bypass controller 300 issues a read 326 to data-RAM to retrieve data.

iii) If no match is found with either cache-hit address or the cache-miss address, then tag bypass controller 300 performs no function for collecting the fetch data. Instead, tag bypass controller 300 waits for the outcome of the tag-RAM access and changes either the cache-miss address or the cache-hit address via path 331.

If the tag-compare and validate 324 outcome is a hit:

Then tag bypass controller 300 will load the fetch address into the cache-hit address register and set a hit valid flag (HVFlag) via path 331. In this case, the data entry will be read out from data-RAM 315 through the normal channels starting from a read request 314 and data output from data-RAM 315 via path 328.

If the tag-compare and validate 324 outcome is a miss:

Tag bypass controller 300 will reset HVFlag. Then:

A) If miss valid flag (MVFlag) is currently valid, meaning there is a cache-miss line refill currently in progress, then tag bypass controller 300 will store the current fetch address to a cache-miss address pending register via path 331. After the current cache-miss refill is done, the cache-miss address register is loaded with the cache-miss address pending register content and the MVFlag remains set.

B) If MVFlag is currently invalid, tag bypass controller 300 will store the current fetch address to the cache-miss address register and set MVFlag to indicate valid.

The cache stops accepting new fetch commands if a tag compare miss is detected. The CPU pipeline stalls as a result. The cache starts accepting new fetch commands when the data-entry for the missed fetch is received from external memory. In the example to follow, the pipeline stalls when address FA1 is a cache miss. After data FD1 is supplied to the CPU, the pipeline re-starts. Other entries in the same cache line may still be waiting to be received from external memory when new fetch commands are accepted.

iv) A match is found both with the cache-miss address and the cache-hit address. Tag bypass controller 300 operates according to case (ii) where a match was found with the cache-hit address but not with the cache-miss address. Tag bypass controller 300 issues a read 326 to data-RAM 315 to retrieve the data.

Figure 2:
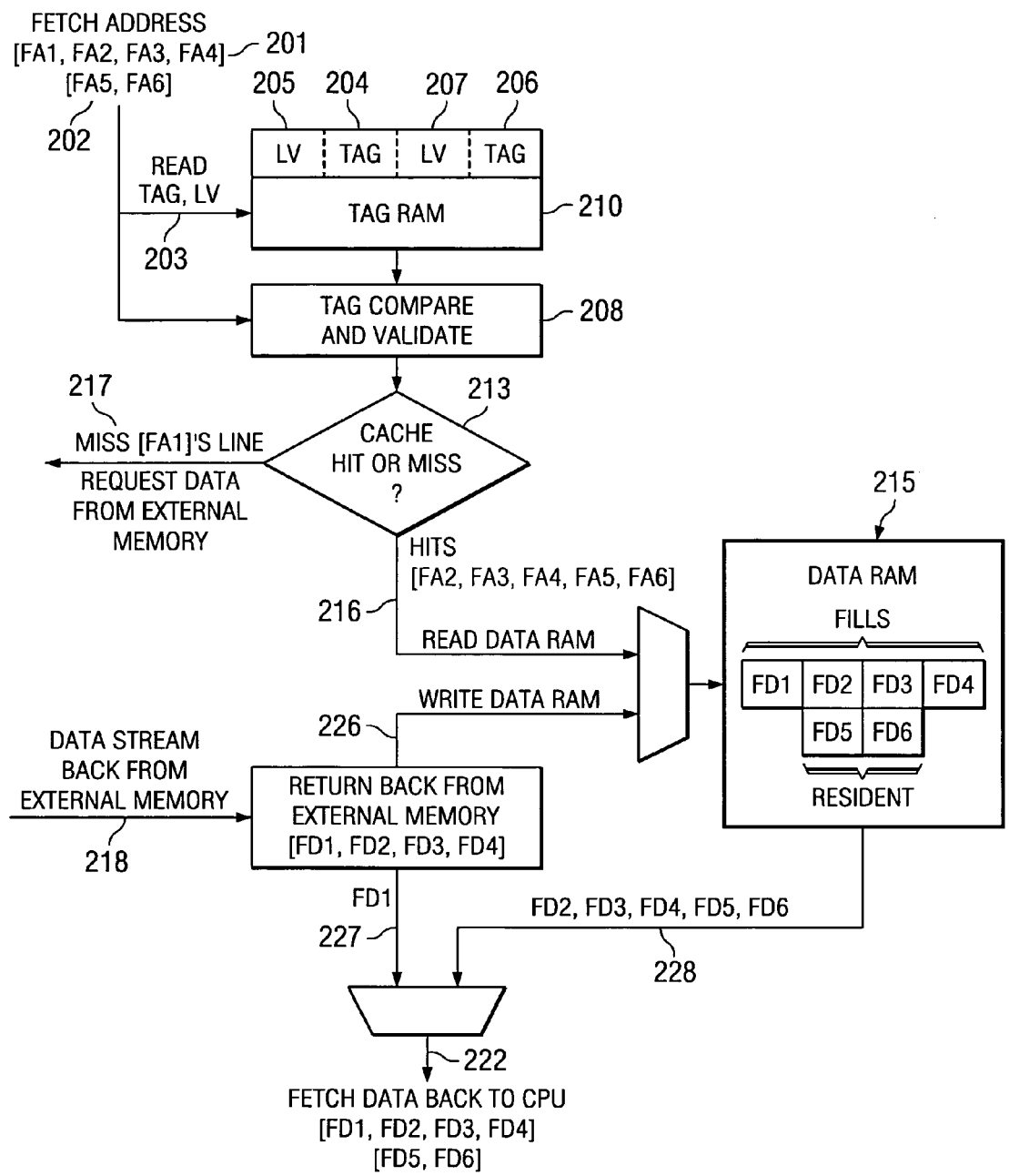
FIG. 2 illustrates the conventional operation of the example two-way cache memory of FIG. 1 (Prior Art)

In comparison with the conventional flow of FIG. 2, the added transactions are:

1. Examination of fetch address inputs 301 or 302 against previously stored cache-miss or cache-hit address registers 316 for same line in the same-line detector 306.

2. Query for previously stored either cache-hit or cache-miss addresses in query block 307.

3. A No response 303 to query 307 causes a normal tag lookup 303.

4. A Yes response 309 to query 307 causes tag-bypass controller 300 to either initiate tag-bypassed read 326 of data stored in data-RAM 315 or wait for data to be returned from external memory and then forward this data directly to the CPU.

5. Storing of most recent cache-hit and cache-miss addresses and respective valid flags in registers 316.

Figure 4:
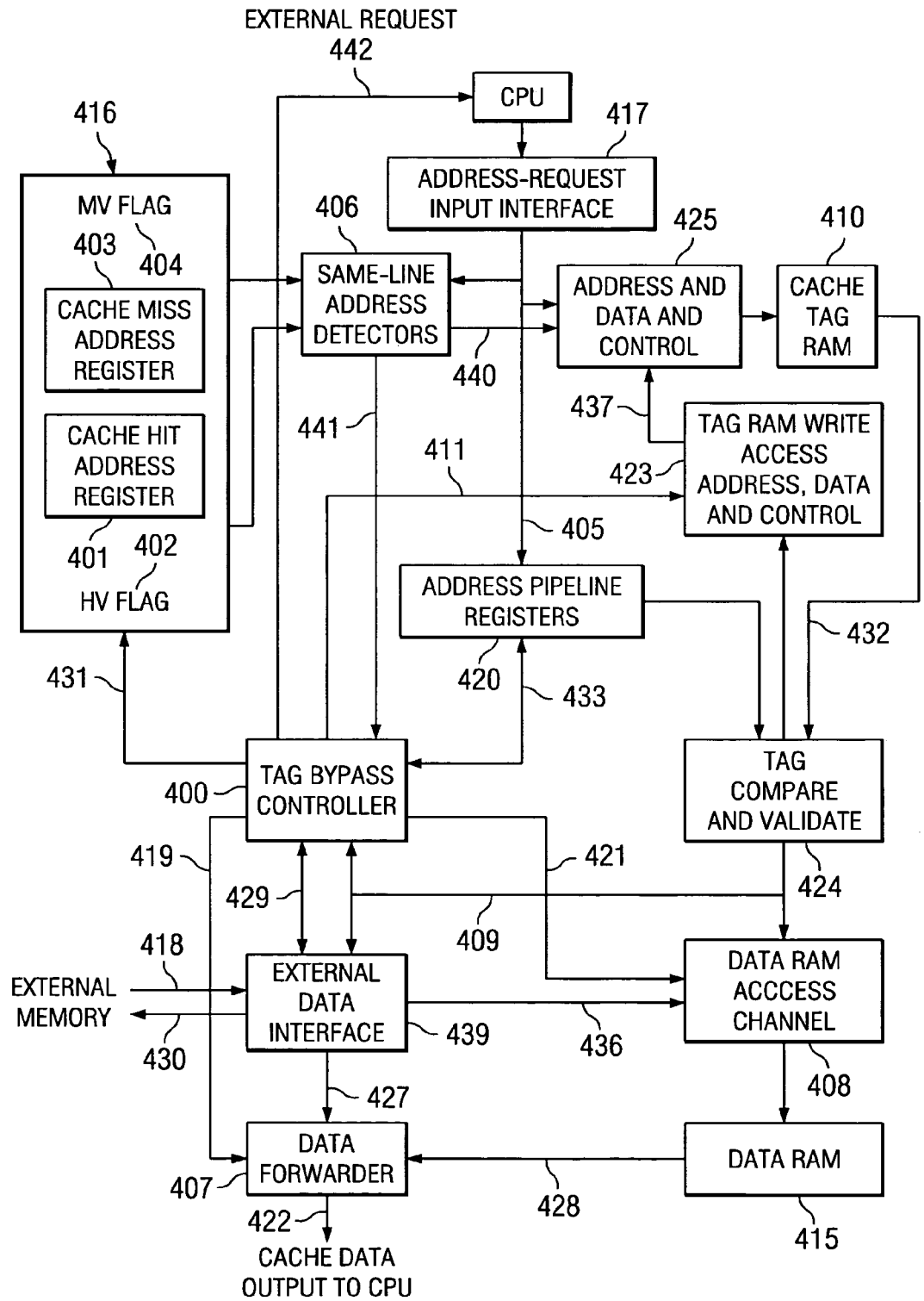
FIG. 4 illustrates a hardware block diagram of the improved the two-way cache memory of this invention.

FIG. 4 illustrates the additional hardware elements employed by this invention. These are:

1) Cache-hit address register 401 storing the fetch address upon detection of a main cache hit;

2) Cache-miss address register 403 storing the fetch address upon detection of a main cache miss;

3) Same-line-address detector 406 compares the fetch address with both cache-hit address register 401 and cache-miss address register 403 provided the respective valid bits are set. If either comparison finds the respective compared addresses in the same cache line, a match is declared. If neither comparator finds same-line addresses, then a mismatch is declared. p 4) Address pipeline registers 420 and data-RAM access channel 408 initiate a read from data-RAM 415 when tag-RAM 410 is bypassed.

5) Tag-bypass-controller 400 monitors the return data stream from external memory and makes the correct data forwarding decisions. It also coordinates the access to data-RAM access channel 408.

6) Cache-hit valid flag 402 signals that the data stored in cache-hit address register 401 is valid. In case of a cache flush or a line replacement, this valid flag will be invalidated.

7) Cache-miss valid flag 404 signals the data stored in cache-miss address register 403 is valid. When the missed line is fully stocked in cache, this valid flag will be invalidated. At this time the valid bit of the fully-stocked cache line is set and subsequent fetches to this main cache line will result in a cache hit.

The improved method and added hardware achieves two positive results:

1. The example stream of fetches for addresses FA1, FA2, FA3, FA4, FA5 and FA6 now requires only two accesses to the tag-RAM 410 instead of six.

2. The latency for servicing fetches at addresses FA2, FA3 and FA4 is reduced.

FIG. 4 illustrates further details of hardware operation described later in the text and identifies these seven added hardware elements. It is helpful to refer to these hardware elements in the description of the flow diagram of FIG. 3 applied to a specific example of fetch addresses requested that follows.

Example of Data Fetch Sequences with Tag-RAM Bypass

In FIG. 3, similar assumptions are made regarding incoming fetches as were made regarding FIG. 2. Data FD1 corresponding to fetch address FA1 is not resident in the main cache data-RAM 315. Similarly data FD2, FD3 and FD4 are not resident in main cache data-RAM 315, but the will be filled as a result of the first fetch address FA1. On the other hand, data FD5 and FD6 are available and resident in main cache data-RAM 315. At the input to the main cache memory a stream of four fetch request addresses 301 arrives including fetch addresses FA1, FA2, FA3 and FA4 which belong to one cache line. Another two fetch request addresses 302 include fetch addresses FA5 and FA6 which belong to another cache line follow. In this example the input fetches are processed in order in the input stream: FA1, FA2, FA3, FA4, FA5 and FA6. FIG. 3 places brackets around the addresses included in the same cache line. Thus [FA1, FA2, FA3, FA4] belong to one cache line and [FA5, FA6] belong to another cache line. For each of the six fetch requests, a look-up 303 in tag-RAM 310 may be conducted. Each look-up yields two corresponding tags 334 and 336 and two corresponding valid bits (LV) 335 and 337 in each set. The following describes how the two crucial improvements are made to vastly improve upon conventional implementations.

When fetch address FA1 first arrives, same-line detector 306 does not detect a match with either the stored cache-miss address or the stored cache-hit address. Thus query block 307 produces a No result 303. As a result, fetch address FA1 is stored in cache-miss address register 316 and the miss valid flag is set. Tag look-up 303 is followed by the normal compare and validate 324 and cache hit or miss query 313. A miss result 313 causes a request for data from external memory 330 to be issued. The cache data line for fetch address FA1 will be then transferred from external memory to the cache via path 318 and 319 and this data FD1 corresponding to fetch address FA1 will be written into data-RAM 315. When the data entry FD1 arrives, it will be also forwarded directly to the CPU via path 327. In this same data stream from external memory, fill data FD2, FD3 and FD4 are also retrieved and written to data-RAM 315 via path 319.

Before FD2 returns from external memory, the cache is ready to process FA2. Same-line-address detector 306 finds a match between FA2 and cache-miss-address register 316 contents tag-RAM lookup is skipped because the query block 307 result is Yes 309. Tag-Bypass-Controller 300 is alerted. When the entry FD2 for FA2 arrives from external memory via path 318, then tag-bypass control 300 forwards FD2 to the CPU directly via control signal 329.

Another possibility is that when CPU fetches request FA2 arrives in cache, the entry FD2 has previously arrived, the tag-bypass controller 300 will retrieve FD2 from data-RAM 315 via tag-bypassed read signal 326 and send it to the CPU via path 328. With this mechanism, the entry FD2 and other 'fill' data being read are returned to CPU whenever they are available and therefore the latency is significantly reduced. The details of the flow process are the same for FA3 and FA4 as for FA2.

When fetch address FA5 arrives, same line detector 306 compares it with cache-miss address registers 316 and no match is found. The cache-hit address register 316 is not compared because the hit valid flag is not set. Fetch address FA5 then requires a lookup 303 from tag-RAM 310 and the result is a cache hit. Fetch address FA5 is stored in cache-hit address register 316 and the hit valid flag is set. The data entry FD5 already resident in data-RAM 315 is read via read path 326 and sent to the CPU via path 328.

When fetch address FA6 arrives, same line detector 306 finds it to match cache-hit address register 316. A tag-RAM lookup is skipped because the query block 307 produces Yes 309. The data entry FD6 will be retrieved by tag-bypass-controller 300 using read path 326 and the stored FD6 data is sent to the CPU via path 328.

From the above example, it is seen that that since only two cache lines are accessed only two tag-RAM accesses are needed although five fetch requests are serviced. This mechanism reduces tag-RAM accesses, not only when the fetch addresses are clustered into same line sequentially, but also when fetch addresses of different lines are mixed. The assumptions are the same: that fetch addresses FA1, FA2, FA3 and FA4 belong to a miss cache line, and that fetch addresses FA5 and FA6 belong to a hit cache line. Assume also that when fetch address FA4 is processed, the cache line fill for the miss cache line is not yet finished. For example, in the following fetch sequences only two tag-RAM lookups are needed out of the six fetches:

1) [FA1, FA2], [FA5, FA6], [FA3, FA4]
2) [FA1, FA2], FA5, [FA3, FA4], FA6.
3) FA1, FA5, FA2, FA6, [FA3, FA4]

The capability of supporting alternating fetch sequences differentiates this invention from any approaches that compare addresses of successive fetches. These prior approaches require three, four and five tag-RAM lookups for the above three fetch sequences respectively.

FIG. 4 illustrates the hardware configuration implementing these objectives. Block 417 represents the address request input interface between the CPU and cache, which includes the address bus and fetch requests sent from the CPU. Multiple signal lines 405 represent the fetch address and request signals that are fanned out to blocks 425, 406 and 420.

Block 410 is the tag-RAM storing tags and valid bits. Block 425 is the logic that merges the address and control signals for reading from and writing to tag-RAM 410. Signal 432 is the output of tag-RAM 410, which includes the tags and valid bits for a two-way set that is indexed by tag-RAM read address. Tag compare and validate logic 424 is the hardware that compares the two tags with the fetch address and checks the corresponding valid bits. Since tag-RAM access is triggered by the rising edge of clock, signal 432 becomes available in the trailing clock cycle after fetch address arrives from the CPU. Therefore, address pipeline registers 420 is necessary to register the CPU fetch address to make it available in the same clock cycle when tags and valid bits become available.

In tag-RAM address and timing logic 425, the write access to tag-RAM 410 has priority over read access. Tag-RAM write access happens when a cache-miss is detected in tag compare and validate logic 424. The write access is controlled by tag-RAM write controller 423.

When a cache-hit is detected in tag compare and validate logic 424, data-RAM access channel 408 is informed via line 409 to read out the corresponding data from data-RAM 415. The data entry output from 415 is transferred to the data forwarder 407 via path 428. The data forwarder 407 merges the data-RAM output 428 with data entry from 427. This data is then sent back to CPU together with a data valid signal via path 442.

When a cache-miss is detected, external data interface 439 is informed via path 429 to request data transfer from memories external to the main cache. Path 430 supplies the address and request signals to this external memory. All of the data entries in the cache line are transferred to external data interface 439 via data path 418. Path 436 represents the bus and control signals that invoke a write access into data-RAM 415 through data-RAM access channel 408.

The tag-bypass controller 400 is critical to this invention, because it directs the control signals to carry out the desired flow. Tag-Bypass Controller 400 has the following function:

1) Controls when the Hit-line Address Register 401 and Hit-line Valid Flag (HV Flag) 402 are to be updated. A cache-hit reported by tag compare and validate logic 424 results in the fetch address being stored in the Hit-line Address Register 401 with Hit-line valid flag set 402 to be valid. A cache-miss reported by tag compare and validate logic 424 results in the hit-line valid flag 402 being reset to invalid, this signal being propagated via paths 409 and 429.

2) Controls when the Miss-line Address Register 403 and Miss-line Valid Flag (MV Flag) 404 are to be updated. If tag compare and validate logic 424 reports a cache-miss and the Miss-line Valid Flag 404 is invalid, the fetch address is stored in the Miss-line Address Register 403 with the MVFlag 404 set to valid. When external data interface 439 reports all entries in the cache line have been transferred to cache, the MVFlag Flag 404 is reset to the invalid state.

3) If tag compare and validate logic 424 reports a cache-miss and the MVFlag 404 is valid, the fetch address is held stored in a miss-line address pending register within the address pipeline register block 420. When external data interface 439 reports all entries in the previous cache-miss line have been transferred to cache, the miss-line address pending register content is transferred to Miss-line Address Register 403 via paths 433 and 431 and MVFlag 404 remains.

4) When the same-line address detector 406 reports the fetch address matches the valid Hit-line Address Register 401, the address bus and control signals 421 to data-RAM access channel 408 are activated to start a read access. The control signals 419 are sent to data forwarder 407 for proper return of output from data-RAM 415 to CPU.

5) Monitors the progress of external data interface 439 regarding how many entries have been transferred to cache and which entries have arrived.

6) When the same-line address detector reports that an incoming fetch address 405 matches the valid Miss-line Address Register 403, the Tag Bypass Controller 400 will check whether the required data entry is available in 415 or not. If the data entry is available, the address bus and control signals 421 to data-RAM access channel 408 are activated by tag bypass controller 400 to start a read access. The control signals 419 are sent to data forwarder 407 for proper return of output from data-RAM 415 to CPU. If the data entry is not available in 415, the CPU fetch will be halted to wait for the data entry to be transferred into cache. Once the required data entry arrives in cache, tag bypass controller 400 will issue a command to data forwarder 407 via 427 to forward the requested data directly to CPU along with the data valid signals. The CPU fetch can be restarted afterwards.

7) Because the cache allows fetches to continue even when a line-fill is ongoing, arbitrations of data-RAN read access and data-RAM write access are needed. These arbitrations are conducted by tag bypass controller 400. In the arbitration process, a write to data-RAM 415 has priority over a read from data-RAM 415. CPU fetch therefore needs to be halted if read and write accesses collide in data-RAM 415.

In prior art, solutions have been suggested reducing the number of tag-RAM accesses by comparing the current fetch address with the preceding fetch address. If these comparisons indicate that the same cache line is involved, then the current fetch does not result in a tag-RAM access.

From the above example, it is seen that that since only two cache lines are accessed only two tag-RAM accesses are needed although five fetch requests are serviced. The present invention has the capability of reducing tag-RAM lookup frequency by an average factor of four for a cache system with four entries per cache line. As a result, the tag-RAM access power can be reduced by a factor of four. In addition, the present invention improves the latency of the cache. Applications are not limited to the cache configurations illustrated in the examples described. This technique can be generalized for a wide variety of cache configurations.

What is claimed is:

1. A method modifying cache operation comprising the steps of:

storing a last cache-miss address of a last received memory access request address which generated a cache miss;

storing a last miss-address valid indicator;

setting the last miss-address valid indicator to indicate valid upon a cache-miss with respect to the last miss-address; and resetting the last miss-address valid indicator to indicate invalid upon determining that data corresponding to the last miss-address is stored in the data-RAM;

storing a last cache-hit address of a last received memory access request address which generated a cache hit;

storing a last hit-address valid indicator;

setting the last hit-address valid indicator to indicate valid upon a cache-hit with respect to the last hit-address; and resetting the last hit-address valid indicator to indicate invalid upon determining that a cache line replacement has occurred with respect to the last hit-address;

on each memory access, comparing a fetch memory address with both the last cache-miss address and the last cache-hit address;

if a match occurs between the fetch memory address and the last cache-miss address and the last miss-address valid indicator indicates valid, or if a match occurs between the fetch memory address and the last cache-hit address and the last hit-address valid indicator indicates valid, bypassing access to a tag-RAM and requesting data from a cache data-RAM; and if a match occurs between the fetch memory address and neither the last cache-miss address nor the last cache-hit address, if a match occurs between the fetch memory address and the last cache-miss address and the last miss-address valid indicator indicates invalid, or if a match occurs between the fetch memory address and the last cache-hit address and the last hit-address valid indicator indicates invalid, accessing the tag-RAM to determine if data is stored in the cache data-RAM.

2. An apparatus performing cache memory control comprised of:

a last miss-address register storing a last miss-line address of a last received memory access request address which generated a cache miss, said last miss-address register being initialized with said current access request address upon a cache miss;

a miss-line valid indicator set to valid upon initialization of said last miss-address register and reset to invalid upon a cache fill operation of data corresponding to said last miss-line address;

a last hit-address register storing a last hit-line address of a last received memory access request address which generated a cache hit, said last hit-address register is initialized with said current access request address upon a cache hit;

a hit-line valid indicator set to valid upon initialization of said last hit-address register and reset to invalid upon cache line replacement corresponding to said last hit-line address;

a cache line comparator comparing a current memory access request address to both said last miss-line address stored in said last miss-address register and said last hit-line address stored in said last hit-address register, said cache line comparator providing a match indication if said current memory access address matches said last miss-line address and said miss-line valid indicator indicates valid, or if said current memory access address matches said last hit-line address and said hit-line valid indicator indicates valid; and providing a non-match indication if said current memory access address matches neither said last miss-line address nor said last hit-line address, if said current memory access address matches said last miss-line address and said last miss-line valid indicator indicates invalid, or if said current memory access address matches said last hit-line address and the last hit-address valid indicator indicates invalid;

a cache data-RAM storing data and corresponding memory addesses;

a tag-RAM storing indications of addresses of data stored in cache data-RAM;

a tag-RAM controller connected to said cache line comparator and said tag-RAM, said tag-RAM controller operative to prohibit access to said tag-RAM to determine if data corresponding to said current memory access request address is stored in said cache data-RAM if said cache line comparator provides said match indication, and enable access to said tag-RAM to determine if data corresponding to said current memory access request address is stored in said cache data RAM if said cache line comparator provides said non-match indication.

* * * * *